United States Patent
Sun et al.

(10) Patent No.: US 9,934,811 B1
(45) Date of Patent: Apr. 3, 2018

(54) METHODS FOR CONTROLLING STRAY FIELDS OF MAGNETIC FEATURES USING MAGNETO-ELASTIC ANISOTROPY

(71) Applicant: Western Digital (Fremont), LLC, Fremont, CA (US)

(72) Inventors: Ming Sun, Pleasanton, CA (US); Jose A. Medina, Pleasanton, CA (US); Ming Jiang, San Jose, CA (US); Ming Zhao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 807 days.

(21) Appl. No.: 14/312,317

(22) Filed: Jun. 23, 2014

Related U.S. Application Data

(60) Provisional application No. 61/949,390, filed on Mar. 7, 2014.

(51) Int. Cl.
| | |
|---|---|
| *G11B 5/858* | (2006.01) |
| *C25D 21/04* | (2006.01) |
| *G11B 5/84* | (2006.01) |
| *C25D 5/18* | (2006.01) |
| *C25D 5/00* | (2006.01) |

(52) U.S. Cl.
CPC ............ *G11B 5/8408* (2013.01); *C25D 5/003* (2013.01); *C25D 5/18* (2013.01); *G11B 5/858* (2013.01)

(58) Field of Classification Search
CPC ......... G11B 5/858; C25D 5/003; C25D 21/04
See application file for complete search history.

(56) References Cited

U.S. PATENT DOCUMENTS

| | | | | |
|---|---|---|---|---|
| 4,053,373 | A | * 10/1977 | McMullen | ............ C25D 3/562 205/260 |
| 4,661,216 | A | * 4/1987 | Anderson | ............ C25D 3/562 205/260 |
| 5,314,596 | A | 5/1994 | Shukovsky et al. | |
| 6,016,290 | A | 1/2000 | Chen et al. | |
| 6,018,441 | A | 1/2000 | Wu et al. | |
| 6,025,978 | A | 2/2000 | Hoshi et al. | |
| 6,025,988 | A | 2/2000 | Yan | |
| 6,032,353 | A | 3/2000 | Hiner et al. | |
| 6,033,532 | A | 3/2000 | Minami | |

(Continued)

OTHER PUBLICATIONS

"Electroplating—How It Works" accessed on Aug. 11, 2017 from https://www.finishing.com/faqs/howworks.shtml.*

(Continued)

*Primary Examiner* — Bryan D. Ripa
(74) *Attorney, Agent, or Firm* — Loza & Loza, LLP; Gabriel Fitch

(57) ABSTRACT

Systems and methods for controlling stray fields of a magnetic feature are provided. One such method can involve selecting a plurality of materials for a magnetic feature, selecting a plurality of additives, combining the plurality of materials for the magnetic feature and the plurality of additives in an electrolyte solution to form a combined solution, adding nitrogen to the combined solution, degassing the combined solution, depositing the combined solution as a thin film on a wafer using pulse plating, and lapping the thin film to form an edge of the magnetic feature. In several embodiments, the magnetic feature is a component of a magnetic transducer such as a writer pole, a reader shield, or a writer shield.

20 Claims, 5 Drawing Sheets

(56) References Cited

U.S. PATENT DOCUMENTS

Figure 1:
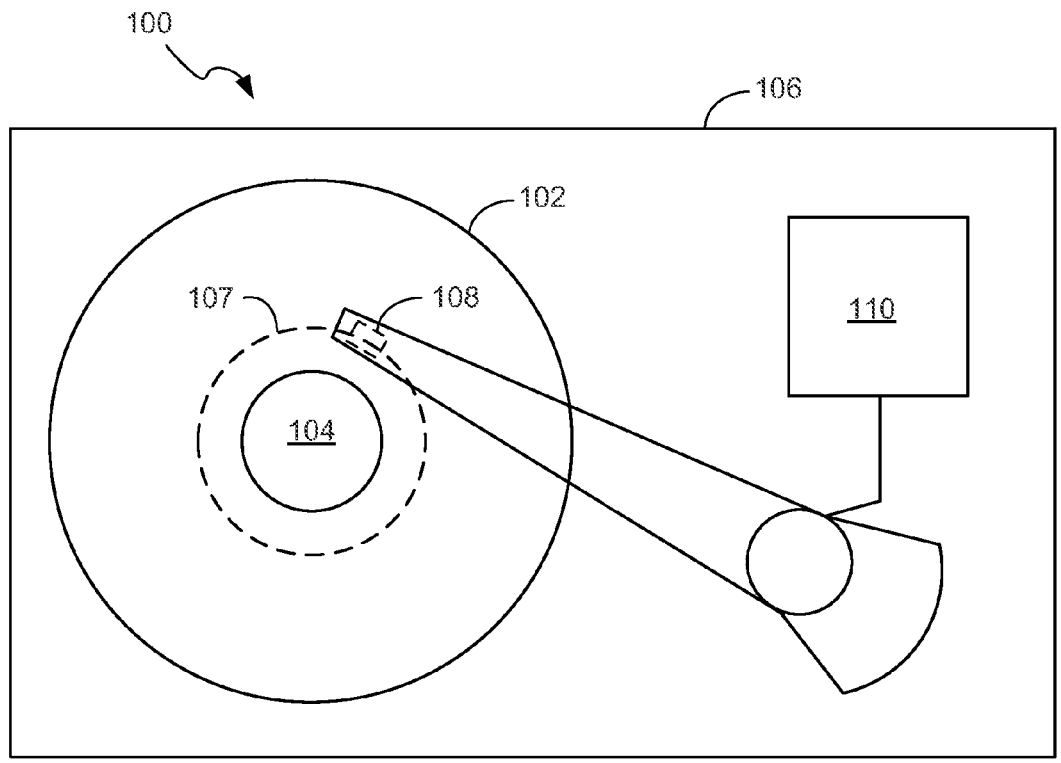

| | | | |
|---|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |

(56) References Cited

U.S. PATENT DOCUMENTS

| | | |
|---|---|---|
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,085 B2 | 2/2004 | Minor et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,855,240 B2 * | 2/2005 | Cooper ............... H01F 41/26 205/103 |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,122,105 B1 * | 10/2006 | Filas ............... C25D 3/20 205/101 |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,294 B1 | 2/2008 | Li et al. |
| 7,333,295 B1 * | 2/2008 | Medina ............... C25D 3/562 360/125.38 |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |

(56) References Cited

U.S. PATENT DOCUMENTS

| | | |
|---|---|---|
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,392,578 B2 | 7/2008 | Sasaki et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,463,449 B2 | 12/2008 | Hirata et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,538,988 B2 | 5/2009 | Li et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,576,950 B2 | 8/2009 | Matono |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | MacChioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,921,544 B2 | 4/2011 | Sasaki et al. |
| 7,950,137 B2 * | 5/2011 | Bonhote ............... G11B 5/112 205/119 |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu |
| 8,077,557 B1 | 12/2011 | Hu |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,110,085 B2 | 2/2012 | Hsiao et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,273,233 B2 | 9/2012 | Chen et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,329,320 B2 | 12/2012 | Zhang et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |

(56) References Cited

U.S. PATENT DOCUMENTS

| | | |
|---|---|---|
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,568,909 B2 | 10/2013 | Li et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0017362 A1 | 1/2003 | Minor et al. |
| 2007/0211379 A1 | 9/2007 | Kato et al. |
| 2008/0107922 A1 | 5/2008 | Ikeda et al. |
| 2008/0239582 A1* | 10/2008 | Kanaya ............... B82Y 25/00 360/313 |
| 2009/0002650 A1* | 1/2009 | Nomoto ............ G03F 7/70341 355/30 |
| 2009/0073608 A1 | 3/2009 | Ookawa et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |

(56) References Cited

U.S. PATENT DOCUMENTS

| | | |
|---|---|---|
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0229728 A1 | 9/2013 | Brinkman et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

"Electroplating" by K. Osborne accessed on Aug. 11, 2017 from https://nzic.org.nz/ChemProcesses/metals/8G.pdf.*

"Electroplating" accessed on Aug. 11, 2017 from https://en.wikipedia.org/wiki/Electroplating.*

Ming Sun, et al., U.S. Appl. No. 13/423,009, filed Mar. 16, 2012, 25 pages.

* cited by examiner

METHODS FOR CONTROLLING STRAY FIELDS OF MAGNETIC FEATURES USING MAGNETO-ELASTIC ANISOTROPY

CROSS-REFERENCE TO RELATED APPLICATION(S)

This application claims priority to and the benefit of U.S. Provisional Application No. 61/949,390, filed on Mar. 7, 2014, entitled, "METHODS FOR CONTROLLING STRAY FIELDS OF A MAGNETIC HEAD USING MAGNETO-ELASTIC ANISOTROPY", the entire content of which is incorporated herein by reference.

BACKGROUND

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks. The disks are generally formed of two main substances, namely, a substrate material that gives it structure and rigidity, and a magnetic media coating that holds the magnetic impulses or moments that represent data. Such disk drives also typically include a read head and a write head (e.g., writer), generally in the form of a magnetic transducer which can sense and/or change the magnetic fields stored on the disks.

Main pole domain lock up, on track erasure, and side track erasure are typical writer reliability issues. All of these issues are related to writer/head stray fields, which can erase the media unintentionally. As such, a method for controlling stray fields of a writer or other magnetic feature is needed.

BRIEF DESCRIPTION OF THE DRAWINGS

FIG. 1 is a top schematic view of a disk drive including a write head that has been fabricated to minimize stray fields in accordance with one embodiment of the invention.

FIG. 2 is a conceptual schematic diagram of a cube of magnetic materials illustrating some basic physics associated with magneto-elastic energy anisotropy and related writer fabrication characteristics that can be controlled to minimize stray fields in accordance with one embodiment of the invention.

FIG. 3 is a flow chart of a process for controlling stray fields of a magnetic feature that can be used to fabricate a write head in accordance with one embodiment of the invention.

FIGS. 4*a*, 4*b*, 4*c* are schematic cross sectional views of a writer having a writer pole formed of tensile materials disposed within a trench formed of compressive materials in accordance with one embodiment of the invention.

FIG. 5 is a graph of stress versus film Fe concentration for a NiFe film write head subjected to various pH levels and temperatures during write head fabrication in accordance with one embodiment of the invention.

FIG. 6 is a graph of stress versus film Fe concentration for a pulse plated FeCo film write head that was subjected to annealing and pulse plating during write head fabrication in accordance with one embodiment of the invention.

FIG. 7*a* is a graph of the probability of a domain lock up issue for a write head that has been fabricated to minimize stray fields in accordance with one embodiment of the invention.

FIG. 7*b* is a graph of domain lock up (DLU) failure rate for a write head that has been fabricated to minimize stray fields in accordance with one embodiment of the invention.

DETAILED DESCRIPTION

In order to address the stray field problem, one can enhance the magnetic anisotropy to the preferred direction. Most commonly, designers might utilize the magnetic shape anisotropy, and/or crystalline anisotropy to achieve something like this. However, due to the complexity of three dimensional (3-D) structures in current perpendicular magnetic writers, most of the time the shape anisotropy is not in the preferred direction. The 3-D device fabrication also limits the implementation of the crystalline anisotropy.

Referring now to the drawings, embodiments of systems and methods for controlling these stray fields of a magnetic feature are illustrated. The methods can involve selecting a plurality of materials for a magnetic feature, selecting a plurality of additives, combining the plurality of materials for the magnetic feature and the plurality of additives in an electrolyte solution to form a combined solution, adding nitrogen (N) to the combined solution, degassing the combined solution, depositing the combined solution as a thin film on a wafer using pulse plating, and lapping the thin film to form an edge of the magnetic feature. In several embodiments, the magnetic feature is a component of a magnetic transducer such as a writer pole, a reader shield, or a writer shield. The systems can involve a magnetic transducer implemented with one of the methods for controlling stray fields of the magnetic feature (e.g., write head).

FIG. 1 is a top schematic view of a disk drive 100 including a write head (e.g., contained with a slider) 108 that has been fabricated to minimize stray fields in accordance with one embodiment of the invention. Disk drive 100 may include one or more of the disks/media 102 to store data. Disks/media 102 reside on a spindle assembly 104 that is mounted to drive housing 106. Data may be stored along tracks 107 in the magnetic recording layer of disk 102. The reading and writing of data is accomplished with the slider/head 108 that can have both read and write elements. The write element (e.g., write head or writer) is used to alter the properties of the magnetic recording layer of disk 102 and thereby write information thereto. In one embodiment, the read element of the head 108 may have tunnel magneto-resistance (TMR) elements.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

FIG. 2 is a conceptual schematic diagram of a cube of magnetic materials illustrating some basic physics associated with magneto-elastic energy anisotropy and related writer fabrication characteristics that can be controlled to minimize stray fields in accordance with one embodiment of the invention. A tensile stress ($\sigma$) is applied to the unit cube, and a magnetization (Ms) of the magnetic materials is initially parallel to the stress. Let Ms then rotate through an angle $\theta$. As it does so, the material will contract along the stress axis when a magneto-striction ($\lambda$) is positive. This contraction, in the presence of a tensile stress, means that work is done on the materials. This work is stored as magneto-elastic energy (shifting the system to higher energy state, which may not be preferable) in the materials and is given by the equation:

$$dEms = -\sigma d\lambda$$

for an infinitesimal rotation of Ms.

Figure 2:
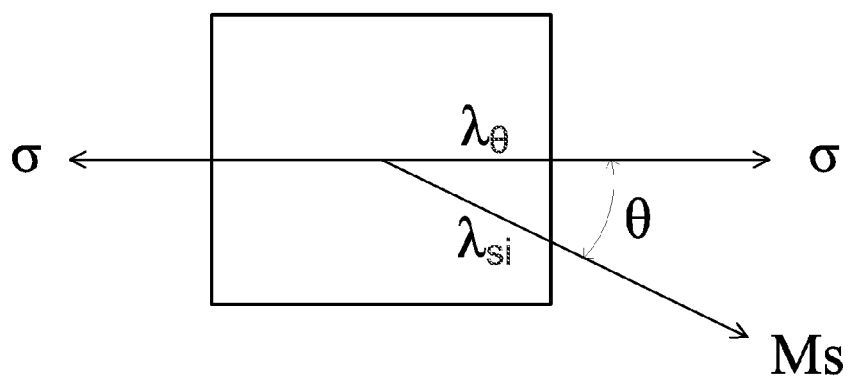

To maximize the utilization of magneto-elastic anisotropy and thereby minimize the stray field in the magnetic head, aspects of the invention involve a design process to control the materials and structure to meet preselected requirements, such as those illustrated in FIG. 2. For high density type magnetic writer heads, the structure and the materials can be carefully selected and fabricated (e.g., designed) to ensure that no stray field or minimal stray fields come out from the air bearing surface (ABS). In such case, issues like domain lock up (DLU), side track erasure or on track erasure can be reduced or prevented all together. In one embodiment, these goals can be achieved by utilizing the magneto-elastic anisotropy of the system.

Figure 3:
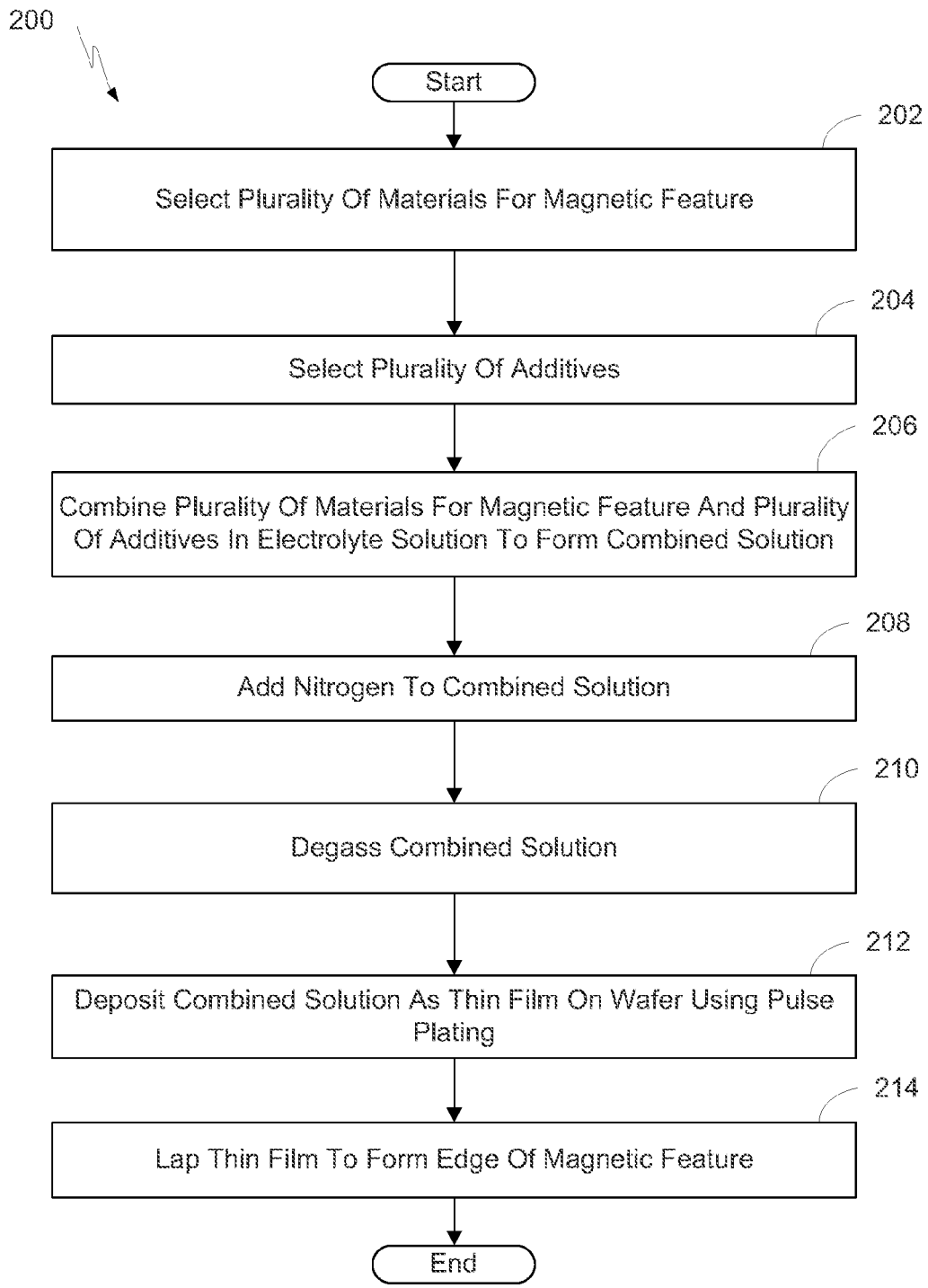

FIG. 3 is a flow chart of a process 200 for controlling stray fields of a magnetic feature that can be used to fabricate a write head in accordance with one embodiment of the invention. In particular embodiments, the process 200 can be used to fabricate the write head of FIG. 1. In some embodiments, the magnetic feature can be a component of a magnetic transducer such as a writer pole, a reader shield or a writer shield. In block 202, the process selects a plurality of materials for a magnetic feature. In block 204, the process selects a plurality of additives. In several embodiments, the process selects the materials (e.g., Fe) such that a product of a magneto-striction of the materials for the magnetic feature and a tensile stress of the materials for the magnetic feature is a positive value. In one such case, the material selection involves selecting a dopant and/or the plurality of additives that such that the product of the magneto-striction and the tensile stress is the positive value. The dopants can include one or more materials such as S, O, H, N, C, and combinations of those materials. For example, the process can add one or more of S at about $5 \times 10^{20}$ atoms per cm3, O at about $5 \times 10^{20}$ atoms per cm3, H at about $5 \times 10^{20}$ atoms per cm3, and/or N at about $5 \times 10^{20}$ atoms per cm3. In one such embodiment, providing higher H and lower S can result in higher stress for the pole materials. In one embodiment, the process can select the materials for the writer pole and one or more organic additives to facilitate design features such as high moment, softness and high stress.

In one embodiment, the plurality of additives includes hydroxylmethyl-P-tolysulfone (HPT) in a concentration between about 0 to about 10 parts per million. In other embodiments, other suitable additives can be used. In block 206, the process combines the plurality of materials for the magnetic feature and the plurality of additives in an electrolyte solution to form a combined solution. In block 208, the process adds nitrogen (N) to the combined solution. In one embodiment, adding the nitrogen can effectively remove oxygen from the combined solution. In several embodiments, the process adds the write pole materials and the organic additives to the electrolyte solution with about 0 to about 0.05 ppm of dissolved oxygen.

In block 210, the process degasses the combined solution. In one embodiment, the degassing can remove oxygen and N from the combined solution. In one embodiment, the degassing involves applying a vacuum pressure to a membrane in contact with the combined solution. In such case, the membrane can be configured to allow gas to pass but not liquid. More specifically, the membrane can be configured to allow gas to escape the electrolyte solution but prevent passage of any liquid, thereby helping to eliminate any gas, such as oxygen, from the electrolyte solution. In one embodiment, the electrolyte solution has about 0 to about 0.05 ppm of $Fe^{3+}$ (e.g., minimal $Fe^{3+}$ since the oxygen has been minimized or eliminated).

In block 212, the process deposits the combined solution as a thin film on a wafer using pulse plating. Pulse plating of these types of pole materials (e.g., to minimize surface roughness) is described in co-pending U.S. patent application Ser. No. 13/423,009, filed on Mar. 16, 2012, and entitled, "METHOD OF ELECTROPLATING IRON-COBALT ALLOY FILMS USING PULSED ELECTROPLATING METHODS", the entire content of which is incorporated herein by reference.

In block 214, the process laps the thin film to form an edge of the magnetic feature. In several embodiments, the lapping can optimize the directional stress as described above.

In several embodiments, the magnetic feature is a writer pole. In one such case, the plurality of materials for the magnetic feature can include CoFe having an Fe content between about 50 and about 75 percent. In another such case, the plurality of materials for the magnetic feature include CoFe with a preselected Fe content, where the plurality of additives are selected to achieve the preselected Fe content.

In several embodiments, the magnetic feature includes Fe and the process further provides a sacrificial anode immersed in the combined solution to reverse oxidation of the Fe. In one such case, the magnetic feature includes $Fe^{2+}$ and the process further provides the sacrificial anode immersed in the combined solution to reverse oxidation of the $Fe^{3+}$.

In several embodiments, the majority of the writer magnetic materials are electroplated (by volume) alloys, and the properties of electroplated magnetic alloys can be easily tuned by altering the plating process. In several such embodiments, aspects of this invention can utilize the high tensile stress of these magnetic alloys.

In one embodiment, the process of FIG. 3 can perform the sequence of actions in a different order. In another embodiment, the process can skip one or more of the actions. In other embodiments, one or more of the actions are performed simultaneously. In some embodiments, additional actions can be performed.

Figure 4A:
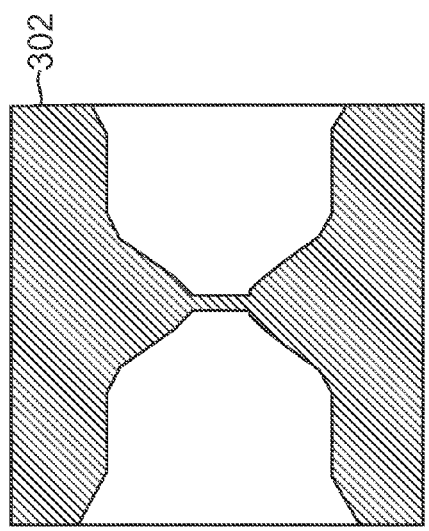
Figure 4C:
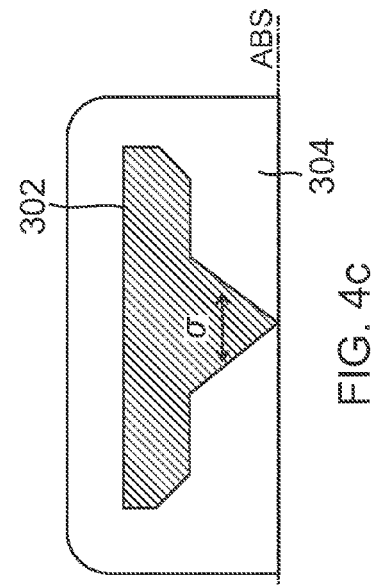
Figure 4B:
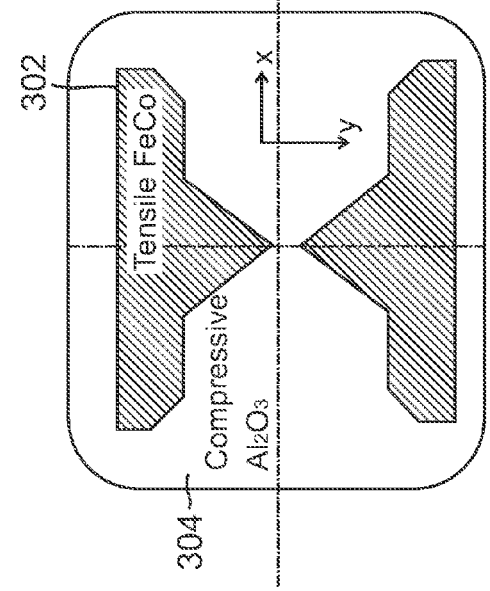

FIGS. 4a, 4b, 4c are schematic cross sectional views of a writer having a writer pole 302 formed of tensile materials (e.g., FeCo) disposed within a trench 304 formed of compressive materials (e.g., Al2O3) in accordance with one embodiment of the invention.

In one embodiment, the fabrication process of FIG. 3 can involve a different combination of stages. For example, in a first stage of a second exemplary process, the process can involve biasing a sign of the product of the material characteristics (product of magneto-striction and tensile stress or $\lambda\sigma$) to configure the system magneto-elastic anisotropy to minimize or eliminate any stray fields. For example, with a positive product of $\lambda\sigma$, $\sigma$ should be parallel to the Ms direction to have the preferred magneto-elastic state (e.g., see FIG. 2 where the direction of Ms is close to being parallel to the direction of $\sigma$). However, for a negative product of $\lambda\sigma$, $\sigma$ would be at about 90 degrees relative to the Ms direction, which would not be preferred.

In one example embodiment for a perpendicular magnetic main writer pole where FeCo materials are used as high moment materials, the remanent Ms direction needs to be contained within a plane of the ABS surface, which can be defined as being along the x direction as depicted in FIG. 4b. In such case, since the plated FeCo materials for this example have a positive magneto-striction (λ), the σ (positive tensile stress) anisotropy can be developed to be as high as possible.

In a second stage of the second exemplary process, the writer structure can be formed with the stress anisotropy in the preferred direction. To introduce the stress anisotropy in the writer, the three dimensional structure can be formed by first constructing the trench, then backfilling the magnetic materials, and finally cutting (e.g., lapping or removing) one side of trench structure to relax the stress of backfilled materials inside the trench in that direction.

Still using the FeCo writer as an example, as described earlier, it may be preferable to have higher tensile stress in the writer application. By choosing high Young's Modulus type trench materials (compressive Al2O3 for example) with the good adhesion between the backfill materials and trench side wall, the backfilled FeCo tensile stress can be preserved. In fact, the FeCo tensile stress can be even higher after thermal annealing. At this stage of the second exemplary process, the system may have high isotropic stress, which may not benefit the design goal until after one side of the trench materials has been removed. After lapping through the trench along the ABS surface (see FIG. 4c for example), the backfilled FeCo high tensile stress gets relaxed in the direction normal to the ABS, which can provide the high stress anisotropy for the FeCo materials remaining in the trench. More precisely, FeCo materials will have strong tensile stress along the x direction in the trench, as shown in FIGS. 4a, 4b, and 4c.

In some embodiments, the thin film FeCo has improved corrosion properties (e.g., Ecorr is about −400 mV versus Ag/AgCl reference electrode). In one embodiment, the FeCo film resistivity is less than about 27 micro ohm cm at a film Fe concentration percentage of about 70%. In one embodiment, the HPT byproduct concentration is about 0 to about 10 ppm (0.01 g/l), and includes byproducts such as p-Toluenesulfinte and p-Toluenesulfonate.

In using the positive λ and positive σ for the FeCo pole materials, the constructed high anisotropy tensile stress (magneto-elastic energy anisotropy) can promote the Ms to stay in the x direction (e.g., the preferred low energy state that is roughly parallel to the ABS).

In a third stage of the second exemplary process, the pole material's increased tensile stress can result in stray fields with a preferential orientation (e.g., cross track but parallel to ABS or in the x direction in FIG. 4b). In one aspect for pole damascene, the higher the tensile stress of the FeCo pole materials, the better the writer pole (e.g., writer) will reduce the stray fields along the y direction, thereby reducing or eliminating the potential domain lock up at the pole tip.

In a fourth stage of the second exemplary process, the use of compressive pole materials may be considered. For highly compressive pole materials, the magneto-striction (λ) may need to be negative to have the same effect.

In a fifth stage of the second exemplary process, it can be considered whether a particular application needs to have stray fields come out of the trench lapping surface. If so, the negative λσ materials can be picked by increasing the stress number.

In a sixth stage of the second exemplary process, aspects of the invention can be considered for applications other than a writer. For example, the way to construct the three dimensional feature, the method to grow the property matched material, and the design to utilize the produced magneto-elastic energy term can be generalized for many applications. For magnetic recording, one or more of the magnetic shield layers in the head can benefit from the magnetic writer fabrication processes in a similar way. That is, they may benefit by controlling the stray fields to prevent the unintended erasure.

Figure 5:
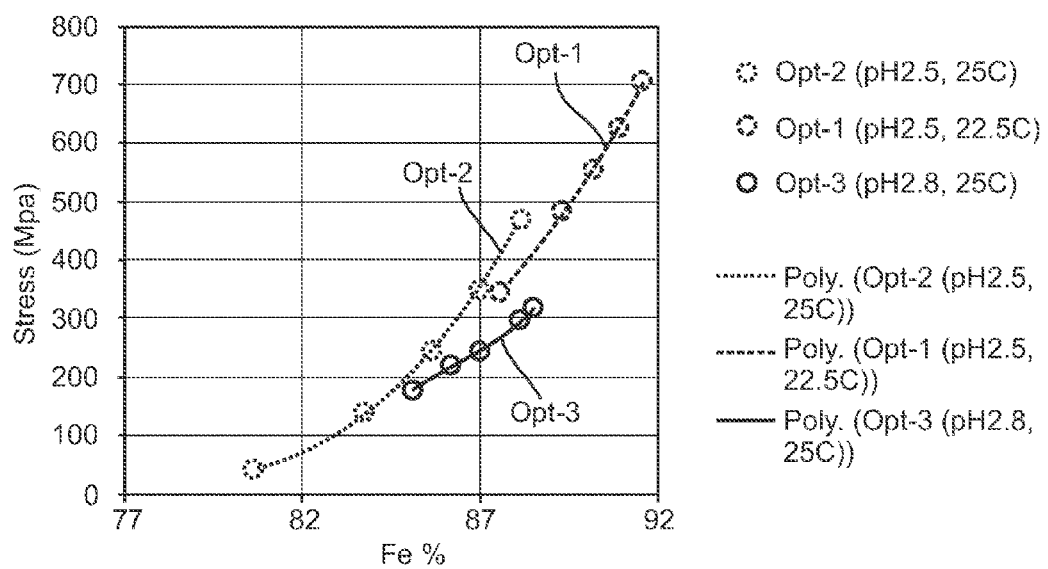

FIG. 5 is a graph of stress versus film Fe concentration for a NiFe film write head subjected to various pH levels and temperatures during write head fabrication in accordance with one embodiment of the invention. The first option ("Opt-1") illustrates the NiFe film write head subjected to a pH level of 2.5 and a temperature of 22.5 degrees Celsius (C). The second option ("Opt-2") illustrates the NiFe film write head subjected to a pH level of 2.5 and a temperature of 25 degrees C. The third option ("Opt-3") illustrates the NiFe film write head subjected to a pH level of 2.8 and a temperature of 25 degrees C. As can be seen in FIG. 5, fitted polynomial lines have been superimposed on the data points for each of the three options.

Figure 6:
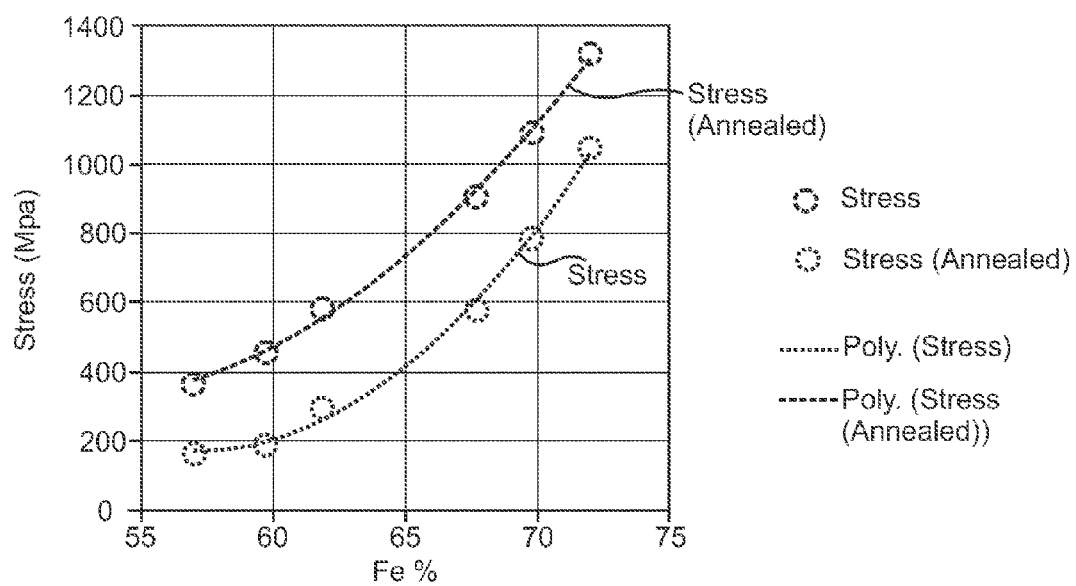

FIG. 6 is a graph of stress versus film Fe concentration for a pulse plated FeCo film write head that was subjected to annealing and pulse plating during write head fabrication in accordance with one embodiment of the invention. One set of data shows the stress, in megapascal, with annealing and the other set of data shows the stress without annealing.

Thus, the stress versus film Fe concentration percentage for electroplated NiFe and FeCo are plotted in FIGS. 5 and 6 individually. Both charts indicate that the film stress is function of the film Fe concentration percentage, and that after the write head is thermally annealed, the tensile stress of those materials is further increased.

As an experiment, DC plated FeCo film (which can include properties such as low stress film and low magneto-elastic anisotropy) and pulse plated FeCo film (which can include properties such as high stress and high magneto-elastic anisotropy) have been deposited into a device damascene pole trench (e.g., made of alumina), for given positive magneto-striction FeCo materials. The high tensile stress pulse plated FeCo (as compared to the DC plated FeCo) is expected to have better aligned magnetization along the x direction (within the ABS surface). Backend device domain lock up (DLU) test results have confirmed this, as shown in FIGS. 7a and 7b.

Figure 7A:
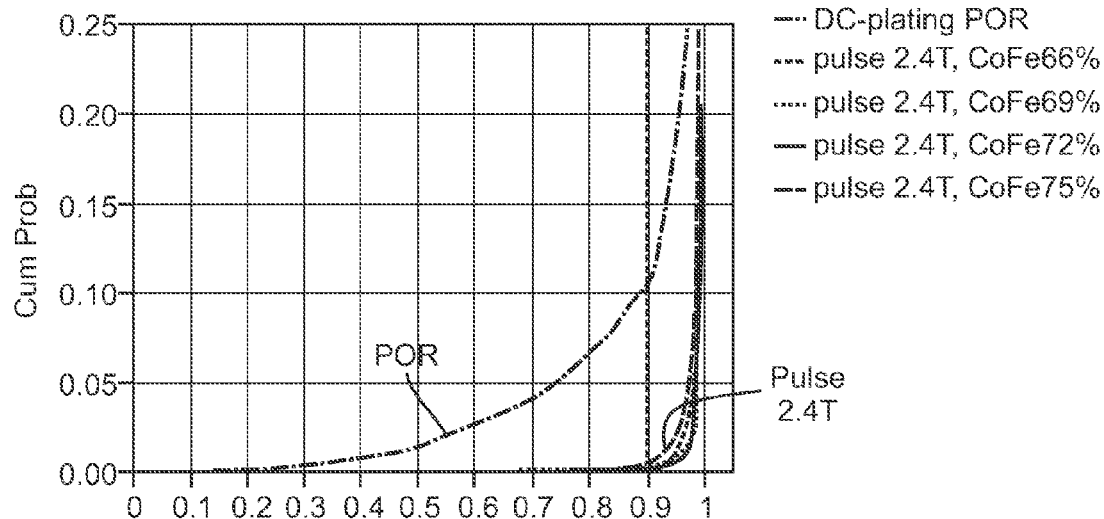

FIG. 7a is a graph of the probability of a domain lock up issue for a write head that has been fabricated to minimize stray fields (e.g., high stress CoFe with varying material concentrations) in accordance with one embodiment of the invention. More specifically, the pulse plating is consistently 2.4 Tesla, while the CoFe has varying Fe percentages of 66, 69, 72, and 75. A reference write head performance is shown for a standard write head with DC plating (see "DC-plating POR" and "POR" curve).

Figure 7B:
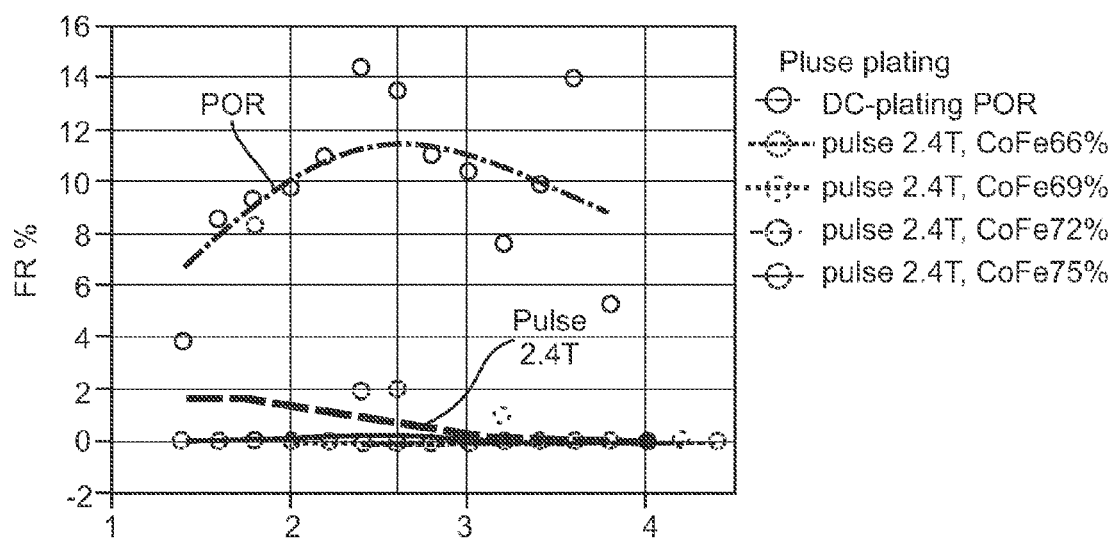

FIG. 7b is a graph of domain lock up (DLU) failure rate (FR in percent) for a write head that has been fabricated to minimize stray fields (e.g., high stress CoFe with varying material concentrations) in accordance with one embodiment of the invention. Similar to the graph of FIG. 7a, the graph of FIG. 7b includes data from write heads involving pulse plating consistently at 2.4 Tesla, while the CoFe has varying Fe percentages of 66, 69, 72, and 75. A reference write head performance is shown for a standard write head with DC plating (see "DC-plating POR" and "POR" curve).

In several embodiments, pulse plated high magneto-elastic energy (high stress) materials has significantly improved domain lock up (DLU) performance.

Most recently, these high magneto-elastic anisotropy (high stress) pulse plated FeCo pole materials have been qualified as being suitable for certain writer pole applications. Magneto-striction is an intrinsic material property, and for most high moment electroplated soft magnetic alloys, it has a positive value. Alloy stress is function of film Fe concentration percentage. High Fe content in the film is one of the signatures of a high stress film which can be utilized to optimize the magneto-elastic energy for head overall stability improvement.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

In several embodiments, the deposition of materials described herein can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for controlling stray fields of a magnetic feature, the method comprising:
    determining a product of a magneto-striction and a tensile stress for candidate materials for a magnetic feature;
    selecting a plurality of materials for the magnetic feature from the candidate materials such that the product of the magneto-striction and the tensile stress of the magnetic feature is a positive value;
    selecting a plurality of additives;
    combining the plurality of materials for the magnetic feature and the plurality of additives in an electrolyte solution to form a combined solution;
    adding N to the combined solution;
    degassing the combined solution;
    depositing a thin film on a wafer from the combined solution using pulse plating to form the magnetic feature having the positive value; and
    lapping the thin film to form an edge of the magnetic feature.

2. The method of claim 1, wherein the magnetic feature is a component of a magnetic transducer selected from the group consisting of a writer pole, a reader shield, and a writer shield.

3. The method of claim 1, wherein the selecting the plurality of materials for the magnetic feature from the candidate materials such that the product of the magneto-striction and the tensile stress of the magnetic feature is the positive value further comprises selecting a dopant and/or the plurality of additives such that the product of the magneto-striction and the tensile stress is the positive value.

4. The method of claim 3, wherein the dopant is a material selected from the group consisting of S, O, H, N, C, and combinations thereof.

5. The method of claim 1, wherein the plurality of additives comprise hydroxylmethyl-P-tolysulfone (HPT) in a concentration between about 0 to about 10 parts per million.

6. The method of claim 1:
    wherein the magnetic feature comprises a writer pole; and
    wherein the plurality of materials for the magnetic feature comprise CoFe having an Fe content between about 50 and about 75 percent.

7. The method of claim 1:
    wherein the magnetic feature comprises a writer pole;
    wherein the plurality of materials for the magnetic feature comprise CoFe with a preselected Fe content; and
    wherein the selecting the plurality of additives comprises selecting the plurality of additives to achieve the preselected Fe content.

8. The method of claim 1:
    wherein the adding the N to the combined solution comprises adding the N to the combined solution to remove oxygen from the combined solution; and
    wherein the degassing the combined solution comprises degassing the combined solution to remove oxygen and N from the combined solution.

9. The method of claim 1, wherein the degassing the combined solution comprises applying a vacuum pressure to a membrane in contact with the combined solution.

10. The method of claim 1:
    wherein the magnetic feature comprises Fe; and
    the method further comprising providing a sacrificial anode immersed in the combined solution to reverse oxidation of $Fe^{3+}$ present in the combined solution.

11. The method of claim 10:
    wherein the plurality of materials comprise $Fe^{2+}$; and
    wherein the sacrificial anode comprises an active metal and is immersed in the combined solution to reverse oxidation of the $Fe^{3+}$.

12. The method of claim 1, wherein the magnetic feature comprises a writer pole.

13. The method of claim 12:
    wherein the selecting the plurality of materials for the magnetic feature from the candidate materials such that the product of the magneto-striction and the tensile stress of the magnetic feature is the positive value further comprises selecting a dopant and/or the plurality of additives such that the product of the magneto-striction and the tensile stress is the positive value; and wherein the dopant is a material selected from the group consisting of S, O, H, N, C, and combinations thereof.

14. The method of claim 13, wherein the plurality of additives comprise hydroxylmethyl-P-tolysulfone (HPT) in a concentration between about 0 to about 10 parts per million.

15. The method of claim 14:
wherein the plurality of materials for the magnetic feature comprise CoFe having an Fe content between about 50 and about 75 percent.

16. The method of claim 15, wherein the degassing the combined solution comprises applying a vacuum pressure to a membrane in contact with the combined solution.

17. The method of claim 16:
the method further comprising providing a sacrificial anode immersed in the combined solution to reverse oxidation of $Fe^{3+}$ present in the combined solution.

18. The method of claim 17:
wherein the plurality of materials comprise $Fe^{2+}$; and wherein the sacrificial anode comprises an active metal and is immersed in the combined solution to reverse oxidation of the $Fe^{3+}$.

19. The method of claim 1:
wherein the selecting the plurality of materials for the magnetic feature from the candidate materials such that the product of the magneto-striction and the tensile stress of the magnetic feature is the positive value further comprises selecting a dopant and/or the plurality of additives such that the product of the magneto-striction and the tensile stress is the positive value; and wherein the dopant comprises S, O, H, and N.

20. The method of claim 1:
wherein the selecting, if the product is the positive value, the plurality of materials for the magnetic feature from the candidate materials further comprises selecting a dopant and/or the plurality of additives such that the product of the magneto-striction and the tensile stress is the positive value; and wherein the dopant comprises S and H, wherein a concentration of H is greater than a concentration of S.

* * * * *